United States Patent [19]

Margalit et al.

[11] Patent Number: 5,606,438
[45] Date of Patent: Feb. 25, 1997

[54] RUGGED LIQUID CRYSTAL DISPLAY AND METHOD OF MANUFACTURE

[75] Inventors: Eli Margalit, Raanana; Yosi Ben-Yosef, Tel Aviv; Boaz Siman Tov; Yakov Mosseri, both of Ramai Gan, all of Israel

[73] Assignee: Motorola, Inc., Schaumburg, Ill.

[21] Appl. No.: 489,519

[22] Filed: Jun. 12, 1995

[30] Foreign Application Priority Data

Jun. 11, 1994 [GB] United Kingdom .................. 9411772

[51] Int. Cl.⁶ .................................................. G02F 1/1335
[52] U.S. Cl. ................................. 349/60; 349/112
[58] Field of Search ............................ 359/69, 83

[56] References Cited

U.S. PATENT DOCUMENTS 4,715,686  12/1987  Iwashita et al. ..................... 359/83
5,106,197  4/1992  Ohuchida et al. .................... 359/83
5,214,522  5/1993  Tagawa ................................ 359/69

FOREIGN PATENT DOCUMENTS 2739651  3/1978  Germany ............................. 359/83
3191329  8/1991  Japan .................................. 359/69

*Primary Examiner*—William L. Sikes
*Assistant Examiner*—James A. Dudek
*Attorney, Agent, or Firm*—M. Mansour Ghomeshi

[57] ABSTRACT

A ruggedized liquid crystal display (LCD) is described having a LCD sandwich (30, 31). A layer of adhesive material (35), such as adhesive coated polyester film, extends continuously across a surface (e.g. the top surface) of the LCD sandwich. A layer of rigid transparent material (e.g. glass) is mounted facing the LCD sandwich and is bonded to the LCD sandwich by the layer of adhesive material.

14 Claims, 2 Drawing Sheets

RUGGED LIQUID CRYSTAL DISPLAY AND METHOD OF MANUFACTURE

FIELD OF THE INVENTION

This invention relates to the ruggedizing of a liquid crystal display.

BACKGROUND OF THE INVENTION

Liquid crystal displays (LCD's) are becoming more and more popular and widely used in many different types of electronic equipment including portable computers and portable data terminal devices. With present technology, LCD's providing the best performance (clarity, brightness, angle vision, resolution etc.) and the greatest size are made of glass and are very sensitive to shock and pressures which arise through normal use of portable devices. Glass LCD's are made of a glass "sandwich" comprising upper and lower glass sheets with liquid crystal elements sandwiched therebetween. In addition to the glass sandwich there is normally an upper polarizer sheet of polarized plastic film stuck to the upper glass sheet by continuous adhesive and a lower polarizer of transparent or transflective or reflective plastics film stuck to the underside of the lower glass sheet by continuous adhesive.

Present arrangements for ruggedizing LCD's involve providing a top glass sheet, generally using strengthened glass and sticking the LCD sandwich to the top glass sheet by an annular strip of double-sided adhesive foam i.e. a strip of foam with upper and lower adhesive surfaces. Generally a backing strip is peeled off one side of the foam and the foam is stuck to the LCD sandwich and another backing strip is peeled off the other side of the foam and the LCD and foam are stuck in place to the underside of the top glass.

Known arrangements for ruggedizing LCD's do not come near to meeting drop test requirements which are expected in many applications. Many general purpose contracts and government contracts require drop testing onto concrete from a height of, for example 3 feet (0.91 meters) and many military requirements call for drop testing from 4 feet (1.22 meters)

There is a need for a more rugged LCD.

SUMMARY OF THE INVENTION

According to the present invention, a ruggedized liquid crystal display is provided comprising a liquid crystal display sandwich, a layer of adhesive material extending continuously across a surface of the liquid crystal display sandwich, and a layer of rigid transparent material mounted facing the liquid crystal display sandwich and bonded thereto by the layer of adhesive material.

The layer of rigid transparent material may be glass or transparent plastics material such as polystyrene or acrylic plastic material. The layer of rigid transparent material may be mounted across the front face of the LCD or across the back face. In the case where the layer of rigid material is mounted across the front face of the LCD, it is preferably made of glass. In the case where the rigid transparent material is mounted across the back face of the LCD, it is preferably a plastic light diffuser material such as acrylic plastics.

The layer of adhesive material may be liquid adhesive, sprayed or rolled onto the surface of the LCD sandwich. A preferred material is a film of plastic material coated on both sides with adhesive. An advantage of such material is that a very uniform thickness of adhesive can be achieved in the manufacture of coated plastic material. The adhesive preferably has a thickness of 20 to 30 micrometers on each side of the plastic material.

As an alternative to applying the adhesive to a film and applying the film to the LCD sandwich, a layer of viscose liquid adhesive can be applied directly to the LCD sandwich (or to the rigid transparent material) by spraying or rolling or by a combination of application techniques. The layer of adhesive preferably has a thickness of 20 to 30 micrometers.

A degree of further increased ruggedness can be achieved by providing front and back layers of rigid transparent material, e.g. glass and plastic materials between which the LCD sandwich is mounted, with a layer of adhesive material disposed across each of the front and back surfaces of the LCD sandwich, to which the respective layers of rigid transparent material are bonded.

A method of manufacture of a LCD is also provided.

A preferred embodiment of the invention will now be described by way of example only, with reference to the drawings.

DETAILED DESCRIPTION OF THE PREFERRED EMBODIMENTS

Figure 1:
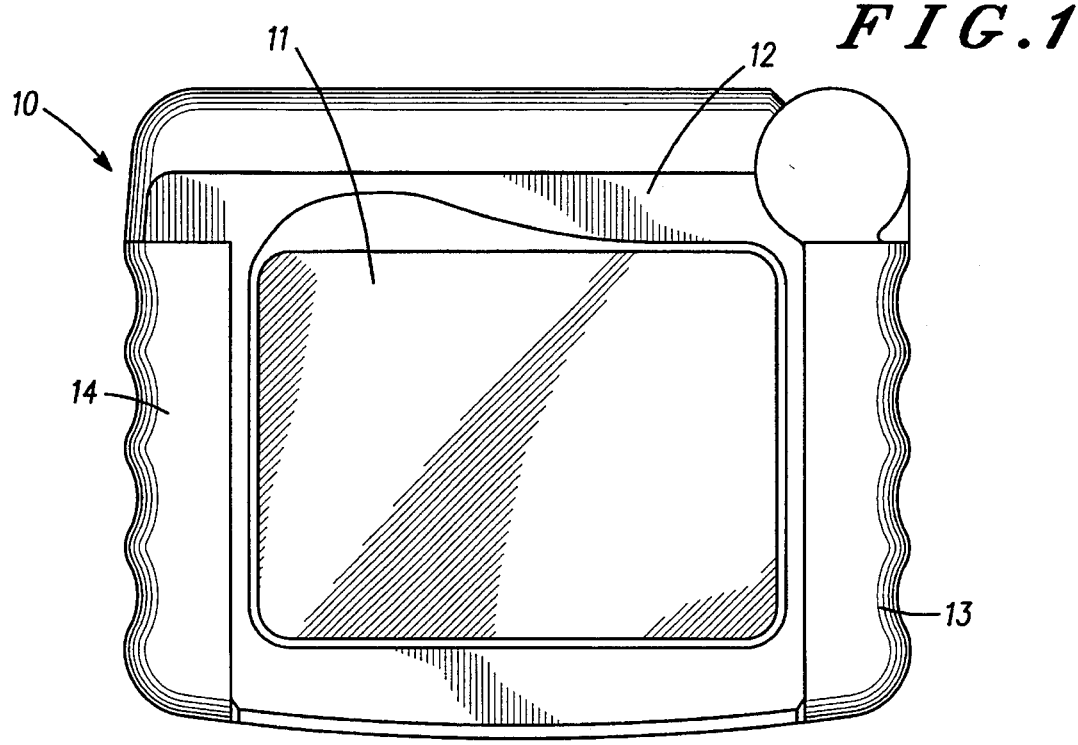
FIGS. 1 and 2 show plan and elevation views respectively of a portable data terminal having a liquid crystal display in accordance with the invention.
Figure 2:
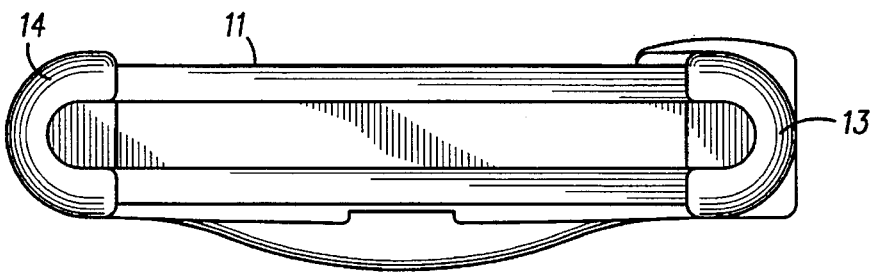

Referring to FIG. 1, a portable terminal 10 is shown having a liquid crystal display (LCD) 11 housed in a housing 12 having elastomeric surrounding buffers 13 and 14.

The LCD 11 comprises a rectangular glass sandwich of a type known in the art. The size of the LCD 11 is generally measured across the diagonal from corner to corner in inches and is available in 5 inch (127 millimeter) and 7.4 inch (188 millimeter) sizes. Larger sizes are more sensitive to shock and pressures than smaller sizes.

Figure 3:
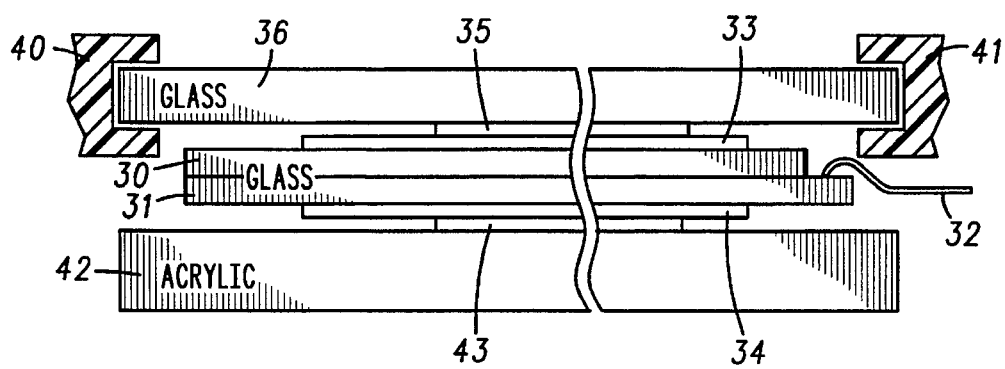
FIG. 3 shows details of the display of the terminal of FIG. 1, with an optional back light diffuser (not to scale)

Referring to FIG. 3. details of the LCD 11 are shown. It comprises an LCD sandwich formed from an upper glass sheet 30 and a lower glass sheet 31 having electrical polarizing elements in between. The lower glass sheet 31 is shown as extending slightly further to the right in the figure beyond the upper glass sheet 30. Electrical contacts 32 are made at this point.

Overlaying the upper glass sheet 30 is an upper polarizer 33. Overlaying the underside of the lower glass sheet 31 is a lowered polarizer 34. The polarizers 33 and 34 are thin films of plastic material which polarize light passing through the glass sandwich. The upper polarizer 33 is transparent. The lower polarizer 34 is either transparent or transflective, depending on whether the LCD has a back light or relies on ambient light for illumination.

Mounted over the surface of the upper polarizer 33 is a plastic film 35. This is a polyester foil supplied by Kotlav Kibbutz of Rosh Hanikra, Israel. For existing commercial applications, this foil is supplied with a single coating of adhesive and is applied to the inside of police vehicles to prevent penetration of the vehicle by projectiles in riot situations. In the present arrangement, the film is coated on both sides with adhesive and is stuck to the upper side of the upper polarizer 33. The other side of the film 35 is stuck to the lower side of a sheet of hardened glass 36. The glass 36 may have a thickness of for example 1.2 to 1.8 millimeters.

The adhesive film 35 has a number of significant advantages. It increases the moment of inertia of the LCD sandwich 30, 31 by causing the LCD and the top glass 36 to behave dynamically as a single unit. This reduces localised stress when the unit as a whole suddenly decelerates in a drop test. This improves the shock resistance performance. It also provides better resistance to local pressure.

The film 35 has a layer of adhesive on either side with a thickness of from 4 microns to a preferred thickness of about 20 to 30 microns. This thickness of adhesive gives flexibility and allows differential thermal expansion between the LCD and the glass 36. Moreover the LCD glass 30 is not exactly flat and this thickness of adhesive makes allowance for undulations.

The film 35 is applied to the LCD sandwich by rolling the film onto the sandwich to prevent air becoming trapped therebetween. The glass 36 is applied to the upper surface of the film 35 by gently tilting the two together, starting with contact at one edge. This similarly acts to exclude air.

Also shown in FIG. 3 are supports 40 and 41, which are annular supports extending round the outside of display 11. These supports support the glass 36. The LCD sandwich 30, 31 is mounted only via the glass 36, thereby preventing other contact points from introducing stress into the glass 30, 31.

As an alternative to the glass 36, or (in the preferred embodiment) as an additional feature, an acrylic plastic back light defuser 42 is provided. This defuser is bonded to the underside of the bottom polarizer by a film 43 identical to film 35.

The inventors have recognised that a problem exists in LCD's in that there is a mis-match in the shock wave propagating through the top glass or the back light diffuser and the shock wave propagating through the glass of the LCD. By bonding these together, they act as a single unit and this mismatch is reduced.

Instead of a double-sided polyester foil 35 or 43, the top polarizer 33 can itself be supplied with adhesive on both sides and can be bonded directly to the glass 36. The same is true for the lower polarizer 34.

As an alternative, adhesive can be used such as acrylic adhesive used in the optical industry for gluing lenses together, applied directly to the upper surface of the top polarizer 33 or the under surface of the glass 36, using a roller or by spraying the glue with nozzles or a combination of both. While offering similar performance, such an arrangement is currently less preferred because the techniques of applying adhesive to the LCD or the glass 36 do not readily provide an even layer of adhesive to the same tolerance of thickness as processes for applying adhesive to continuous polyester film.

The double-sided adhesive foil has the advantage of providing the polarizer 33 or 34 with resistance to chemical attack.

Figure 4:
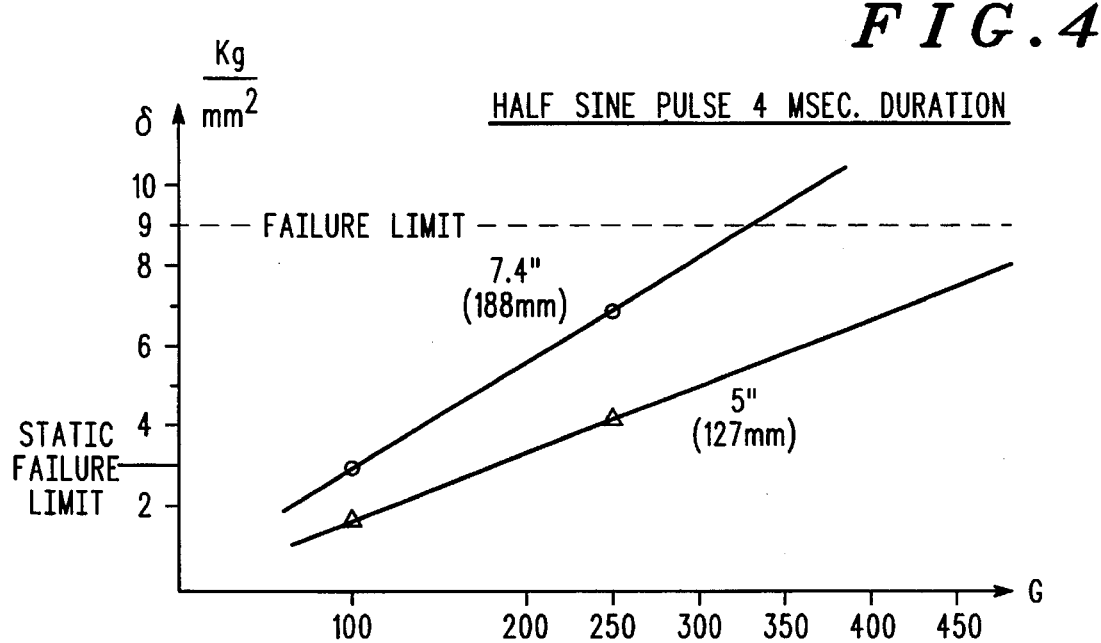
FIG. 4 shows a plot of the stress limits of different sizes of LCD constructed as shown in FIG. 3 when subjected to a half sine pulse of 4 milliseconds duration, the pulse magnitude being measured in units of gravitational acceleration.

Referring to FIG. 4, a graph of stress introduced by a half sine pulse of 4 milliseconds duration is illustrated for different gravitational acceleration (G) values. The static failure limit for a typical LCD display is shown as being 3 $kg/mm^2$. As a general rule the dynamic failure limit, i.e. the stress introduced by a shock wave in a drop test is three times the static failure limit. Empirical tests have shown this to be correct in the present case and the dynamic failure limit is illustrated as about 9 kg per $mm^2$. FIG. 4 shows that a 7.4 inch (188 millimeter) LCD will fail under about 330 G, while a 5 inch (127 millimeter) LCD will fail at about 540 G (by extrapolation).

Figure 5:
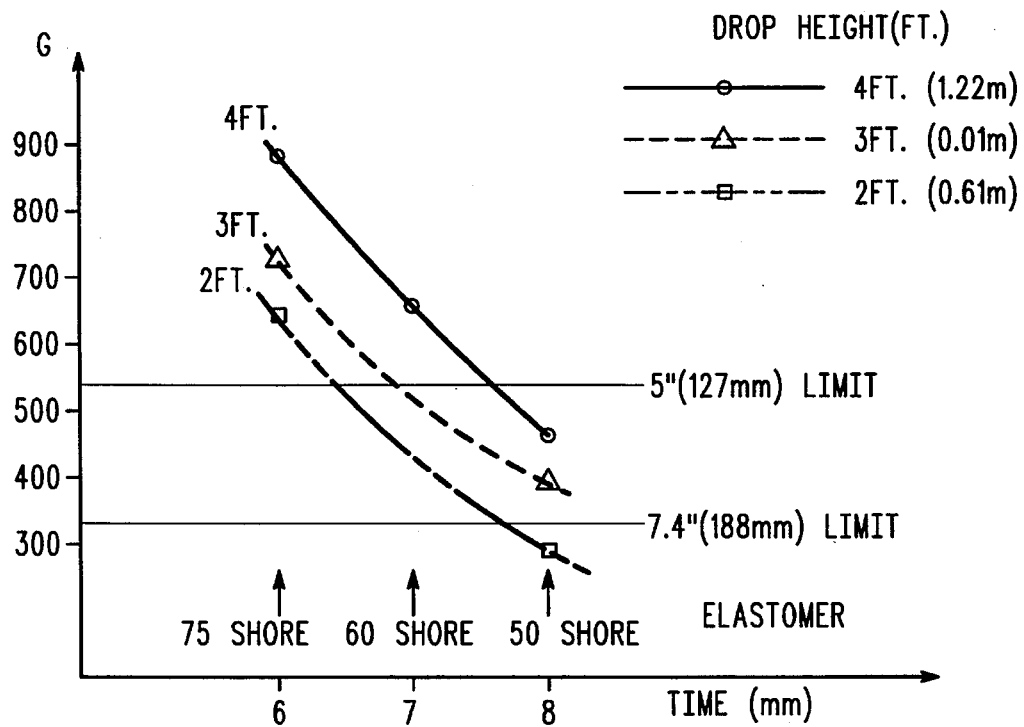
FIG. 5 shows calculated drop test results for a 2 pound (0.91 kg) terminal using different elastomer casings and different top glass thicknesses.

Referring to FIG. 5, this figure shows calculations for the acceleration introduced by dropping a 2 pound (0.91 kg) unit onto concrete from different heights, where the unit has different hardnesses and thicknesses for the elastomeric housing buffers 13 and 14. In the graph, the values along the abscissa are different combinations of elastomer hardness and thickness. Thus the graph shows acceleration values for the following combinations of hardness and thickness; 75 Shore and 6 millimeters, 60 Shore and 7 millimeters, 50 Shore and 8 millimeters.

Three sets of results are noted, representing drop testing from 2 feet (0.61 meters), 3 feet (0.91 meters) and 4 feet (1.22 meters). These show that a 7.4 inch (188 millimeter) LCD requires an elastomer of between 50 and 60 Shore hardness and a thickness of between 7 and 8 millimeters for it to survive a 2 feet drop test. The same elastomer hardness and thickness will allow a 5 inch (127 millimeter) display to survive a 3 feet (0.91 meters) drop, but will place it on the limit of its ruggedness when dropped from 4 feet (1.22 meters). As another example, a 5 inch (127 millimeter) display with 7 millimeter elastomer thickness and 60 Shore hardness will be at its limit of ruggedness if dropped from 3 feet (0.91 meters).

The results shown in FIG. 4 and FIG. 5 represent typically a 40% increase in survivable stress in a drop test over prior art LCD's.

We claim:

1. A ruggedized liquid crystal display comprising:
   a liquid crystal display sandwich,
   a layer of adhesive material extending continuously across a surface of the liquid crystal display sandwich, and
   a layer of substantially rigid transparent material mounted facing the liquid crystal display sandwich and bonded thereto by the layer of adhesive material which later having a thickness in the range of about 20 micrometers to about 30 micrometers.

2. A display according to claim 1, wherein the surface of the display sandwich is a front viewing surface.

3. A display according to claim 2, wherein the substantially rigid transparent material is glass.

4. A display according to claim 3, wherein the layer of adhesive material is a film of plastics material coated on both sides with adhesive.

5. A display according to claim 4, wherein the plastics material is polyester foil.

6. A display according to claim 4, wherein the adhesive comprises a on each side of the plastics material.

7. A display according to claim 3, wherein the adhesive material is a layer of viscous adhesive.

8. A display according to claim 1 wherein the layer of substantially rigid transparent material is fixed to a housing which surrounds and houses the display, whereby the liquid crystal sandwich is supported in the housing by the layer of rigid material.

9. A display according to claim 1, wherein the surface of the display sandwich is a back surface and the substantially rigid transparent material is a backlight diffuser.

10. A display according to claim 1, wherein the surface of the display sandwich is a front viewing surface and the layer of substantially rigid transparent material is mounted facing front viewing surface of the liquid crystal display sandwich and wherein a further layer of adhesive material is provided, extending continuously across a back surface of the liquid crystal display sandwich, and a substantially rigid backlight diffuser is mounted facing the back surface of the liquid crystal display sandwich and bonded thereto by the further layer of adhesive material.

11. A method of manufacture of a liquid crystal display, comprising the steps of:

provying a liquid crystal display sandwich, providing a layer of substantially rigid transparent material, applying a layer of adhesive material having a thickness in the range of about 20 micrometers to about 30 micrometers to one of said liquid crystal display sandwich and said layer of substantially rigid transparent material and bonding said liquid crystal display sandwich to said layer of substantially rigid transparent material by means of said layer of adhesive material.

12. A method according to claim 11, wherein the step of applying comprises laying a film of plastics material coated on both sides with adhesive onto one of said liquid crystal display sandwich and said layer of substantially rigid transparent material.

13. A method according to claim 11, wherein the step of applying the layer of adhesive material comprises spraying adhesive onto at least one of said liquid crystal display sandwich and said layer of substantially rigid transparent material.

14. A method according to claim 11, wherein the step of applying the layer of adhesive material comprises rolling adhesive onto at least one of said liquid crystal display sandwich and said layer of substantially rigid transparent material.

* * * * *